G. FORTON.
HANDSAW.
APPLICATION FILED OCT. 3, 1921.

1,438,175. Patented Dec. 12, 1922.

Inventor
George Forton
By [signature]
Attorney

Patented Dec. 12, 1922.

1,438,175

UNITED STATES PATENT OFFICE.

GEORGE FORTON, OF DETROIT, MICHIGAN.

HANDSAW.

Application filed October 3, 1921. Serial No. 504,987.

*To all whom it may concern:*

Be it known that I, GEORGE FORTON, a citizen of the United States of America, residing at Detroit, in the county of Wayne and State of Michigan, have invented certain new and useful Improvements in Handsaws, of which the following is a specification, reference being had therein to the accompanying drawings.

This invention relates to hand saws and the primary object of my invention is to furnish a saw blade with a quick detachable or demountable handle, that may be used by either a right or left handed operator, and that will permit of all of the teeth of the saw blade being set or sharpened. In other words, the blade, devoid of the handle, may be easily placed in a vise, clamp, tooth-setting machine or other device and all of the teeth set or sharpened which is practically impossible when a handle is a fixture on a blade, as the teeth at the inner end of the blade cannot be conveniently sharpened or set, thus limiting more or less the active cutting edge of a saw blade.

Another object of this invention is to provide positive and reliable means, in a manner as hereinafter set forth for detachably connecting a saw handle to a blade, frame or the like so that the front edge of the handle will be firmly held and fixed relative to the back edge of the saw blade, thus permitting of the front edge of the saw handle and the back edge of the saw blade cooperating in providing a right angle square. The means employed for connecting a handle and blade provides a substantial backing for the inner end of the blade and said means disposed so that it will not interfere with a hand manipulating the saw.

A further object of this invention is to furnish a saw handle with a reinforcing member which will prevent a handle from splitting, cracking or breaking due to the grain of the wood being interrupted by the shape of the handle.

The above are a few of the objects obtained by my invention, and reference will now be had to the drawing, wherein Figure 1 is a side elevation of the hand saw, partly broken away and partly in section, showing a saw adapted for right hand use;

Figure 1:
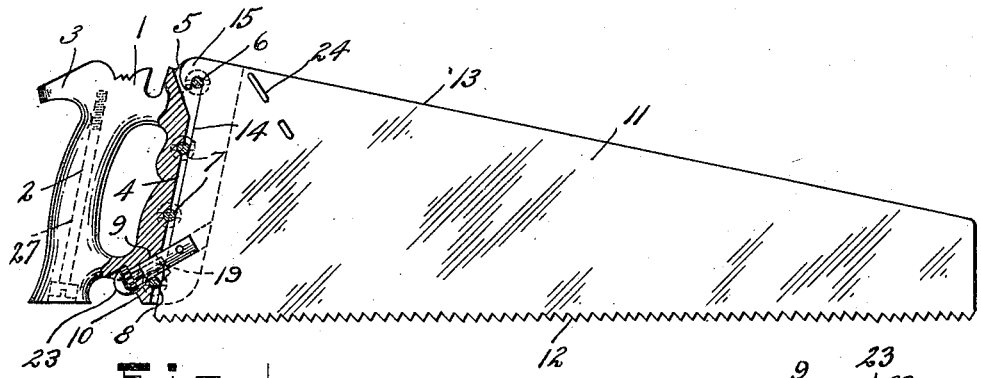
Figure 2:
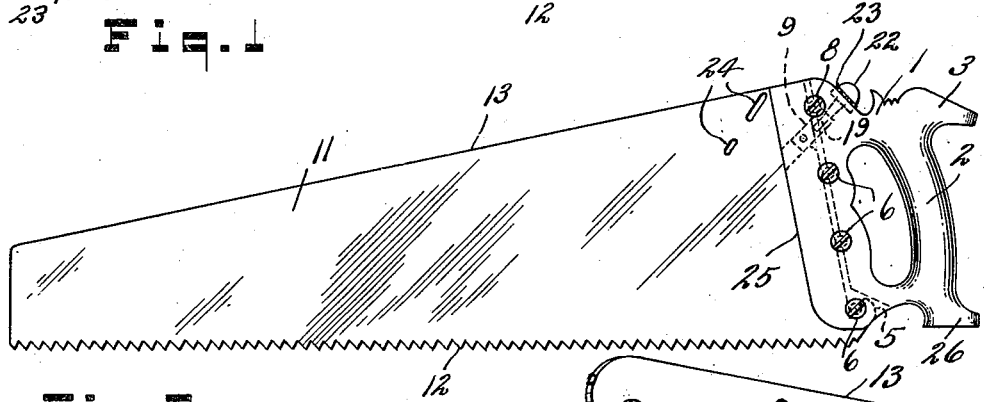
Fig. 2, is a side elevation of the saw adapted for left hand use.
Figure 4:
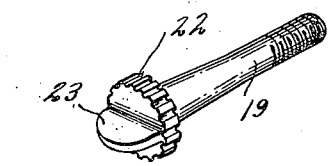
Fig. 4 is an enlarged perspective view of a detached screw.
Figure 3:
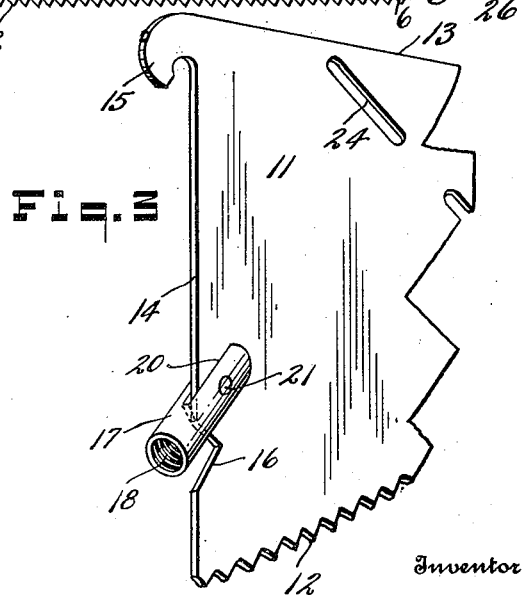
Fig. 3 is an enlarged perspective view of a portion of a detached blade.

In the drawing, the reference numeral 1 denotes a saw handle made of wood and having a hand grip portion 2 provided with an upper lip 3. The front edge of the handle 1 has a longitudinal kerf or groove 4 with the upper end thereof enlarged, as at 5. Extending transversely of the front portion of the handle are a plurality of screws 6, 7 and 8 having countersunk heads and ends so that there will be no protuberances from the outer side walls of the handle. Rivets may be used in lieu of these screws and the screw 6 extends transversely of the enlarged end 5 of the groove 4, said screw being located in alinement with the inner wall of the groove, and the screws 7 and 8 intersect the inner wall of the groove and halfway protrude therefrom so as to provide spaced metallic bearing points in the bottom of the groove.

Communicating with the groove 4, adjacent the screw 8 is an angularly disposed opening 9 having its outer end at an inset angular face in the bottom side or lower edge of the handle.

The reference numeral 11 denotes a blade having teeth 12 that may adapt the blade for cross-cut, rip or other purposes, and the back edge 13 of the blade is at a right angle to the inner end edge 14 thereof. At the juncture of the edges 13 and 14 there is a hook shaped member 15 adapted to engage over the screw 6 with the remainder of the edge 14 bearing on the metallic bearing points afforded by the screws 7 and 8.

The inner end edge 14 of the blade 11, adjacent the teeth 12, is provided with a notch 16 and set in said notch is a tubular socket member 17 having interiorly screwthreaded walls or a bore 18 adapted to receive a holdfast device, as a screw bolt 19. The tubular socket 17 has its inner end slotted, as at 20, to receive the edge of the blade 11 and a transversely disposed rivet 21 or other fastening means retains the tubular socket in engagement with the blade 11, with the inner wall of the slot 20 against the wall of the notch 16 so that there will be no lost motion or loose articulation between the socket member and the blade.

After the hook shaped member 15 is placed in engagement with the screw 6 the socket member 17 will extend into the opening 9 of the handle 1, and then the screw bolt 19 can be placed in the opening 9 to enter the socket 17. The screw bolt 19 has a head 22 and a finger piece 23 so that it may be easily rotated and with the head 22 bearing on the face 10 of the handle 1 the socket 17 can be drawn into the opening 9, until the edge 14 of the blade 11 is firmly bound against the screws 7 and 8 and the hook shaped member 15 in locking engagement with the screw 6, thus permitting the screw 6, member 15, socket 17, and screw bolt 19 cooperating in positively anchoring the inner end of the blade relative to the handle. The head of the screw bolt 19 is sufficiently set into the handle 1 so as not to interfere with a hand gripping the hand piece 2 in the usual manner, and except for the protruding portion of the screw bolt the saw will have the appearance of an ordinary cross-cut or rip saw.

In addition to the demountable feature of the saw handle, there are certain refinements which will now be considered.

First, the saw blade 11, adjacent the straight edge 13 thereof and the handle attached to the blade, has one or more angularly disposed slots 24 which are positioned at an angle of forty five degrees relative to either the straight edge 13 of the blade or the straight edges 25 of the handle 1. When using the saw as a square marks may be made through the slots 24 on a piece of material to facilitate cutting a miter or a kerf at an angle to a straight edge.

Second, the saw handle 1 may have a lower lip 26 so that it may be more conveniently used by a left hand operator, and the hand grip portion 2 may be reinforced by a long screw or tie rod 27 countersunk therein, said screw extending transversely of the grain of the wood handle to bind the wood together and prevent splitting or cracking.

While in the drawings there are illustrated the preferred embodiments of my invention, it is to be understood that the structural elements are susceptible to such changes as fall within the scope of the appended claim.

What I claim is:—

In a hand saw, a handle having a groove throughout its depth and an angularly disposed opening in its lower edge communicating with said groove, transverse members in said handle intersecting the groove thereof, a blade having its inner end edge in the handle against said transverse members, hook means carried by the back edge of said blade engaging over the transverse member in the upper end of the handle groove to retain said blade in the handle groove and prevent said blade from sagging when engaging said transverse members, a tubular socket carried by the inner end edge of said blade and extending into the angularly disposed opening in said handle, and a screw bolt abutting the lower edge of said handle and screwed in said tubular socket for drawing the inner end edge of said blade tight against said transverse members.

In testimony whereof I affix my signature in presence of two witnesses.

GEORGE FORTON.

Witnesses:
ANNA M. DORR,
KARL H. BUTLER.